United States Patent

Watts et al.

[11] 4,062,168
[45] Dec. 13, 1977

[54] CONTAINER FILLING MACHINE

[76] Inventors: Thomas E. Watts, P.O. Box A; Thomas R. Watts, Rte. No. 2, Box 3 A, both of Shelley, Idaho 83274

[21] Appl. No.: 729,971

[22] Filed: Oct. 6, 1976

[51] Int. Cl.² .................. B65B 57/10; B65B 5/10
[52] U.S. Cl. .......................... 53/64; 53/245; 198/454; 198/627
[58] Field of Search ............... 53/35, 64, 245, 162; 141/262; 198/454, 418, 627, 572

[56] References Cited

U.S. PATENT DOCUMENTS

| | | | |
|---|---|---|---|
| 3,147,846 | 9/1964 | Huntoon | 53/64 X |
| 3,420,038 | 1/1969 | Crabb | 53/245 X |
| 3,492,779 | 2/1970 | Russell | 53/245 X |
| 3,799,324 | 3/1974 | Hall | 198/626 X |
| 3,825,106 | 7/1974 | Wickam et al. | 53/64 X |

Primary Examiner—Travis S. McGehee
Attorney, Agent, or Firm—Clarence A. O'Brien; Harvey B. Jacobson

[57] ABSTRACT

A container filling machine has a conveyor assembly arranged for transporting articles to an elevated loading station at which is disposed a box or other suitable receptacle to be filled with the articles. The receptacle is raised to the loading station by an elevator device which lowers the receptacle as a function of articles placed in the container by a discharge portion of the conveyor assembly. A control system includes a sensor mounted on an area of the discharge portion of the conveyor assembly which is inserted into the receptacle being filled for discharging the articles from within the receptacle so as to actuate the elevator device upon detection by the sensor of the presence of articles within the receptacle up to a level immediately adjacent the sensor. By this arrangement, the distance the articles must fall when passing from the conveyor system to the receptacle is kept at a practical minimum so as to prevent damage to the articles.

9 Claims, 6 Drawing Figures

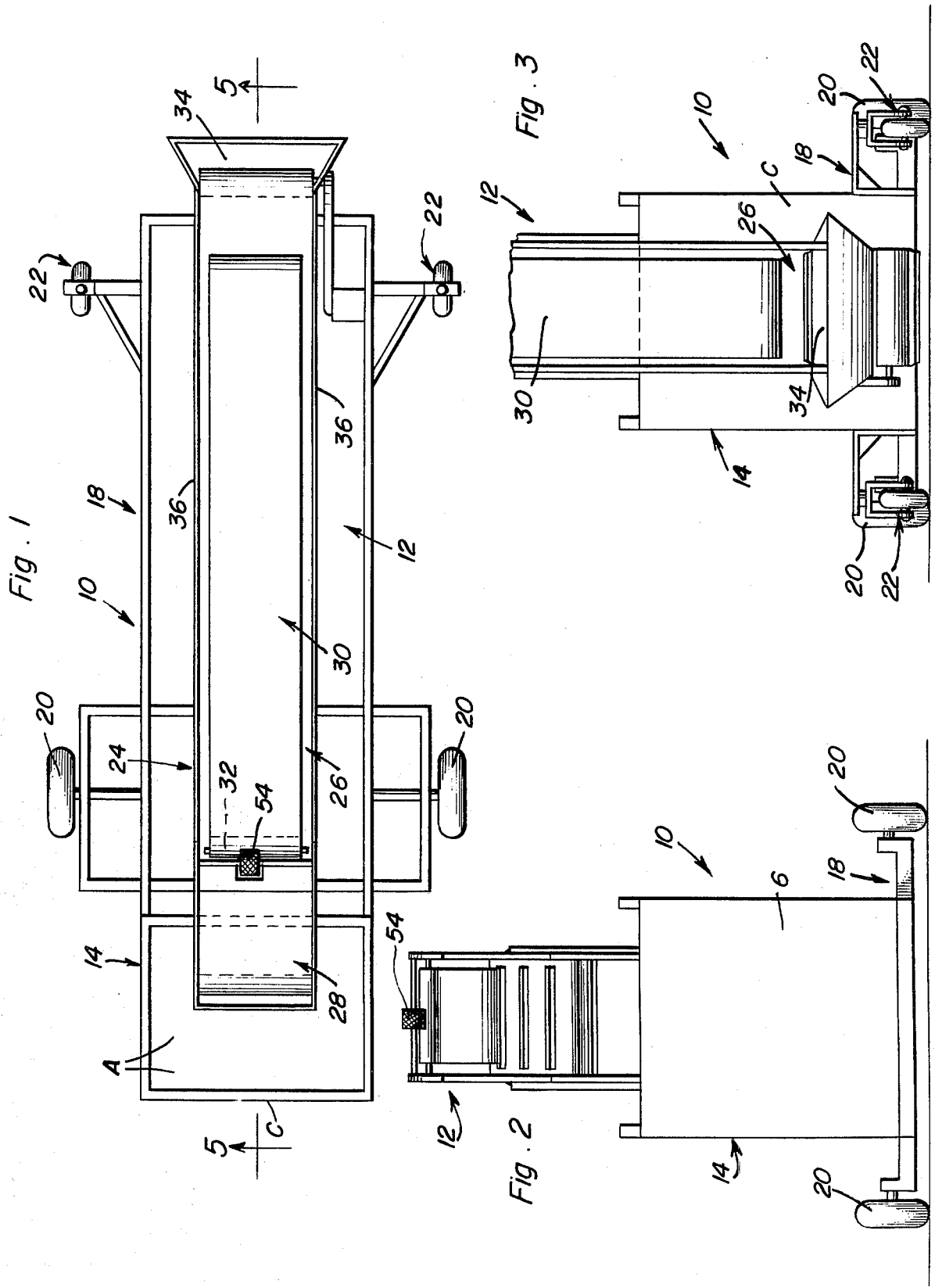

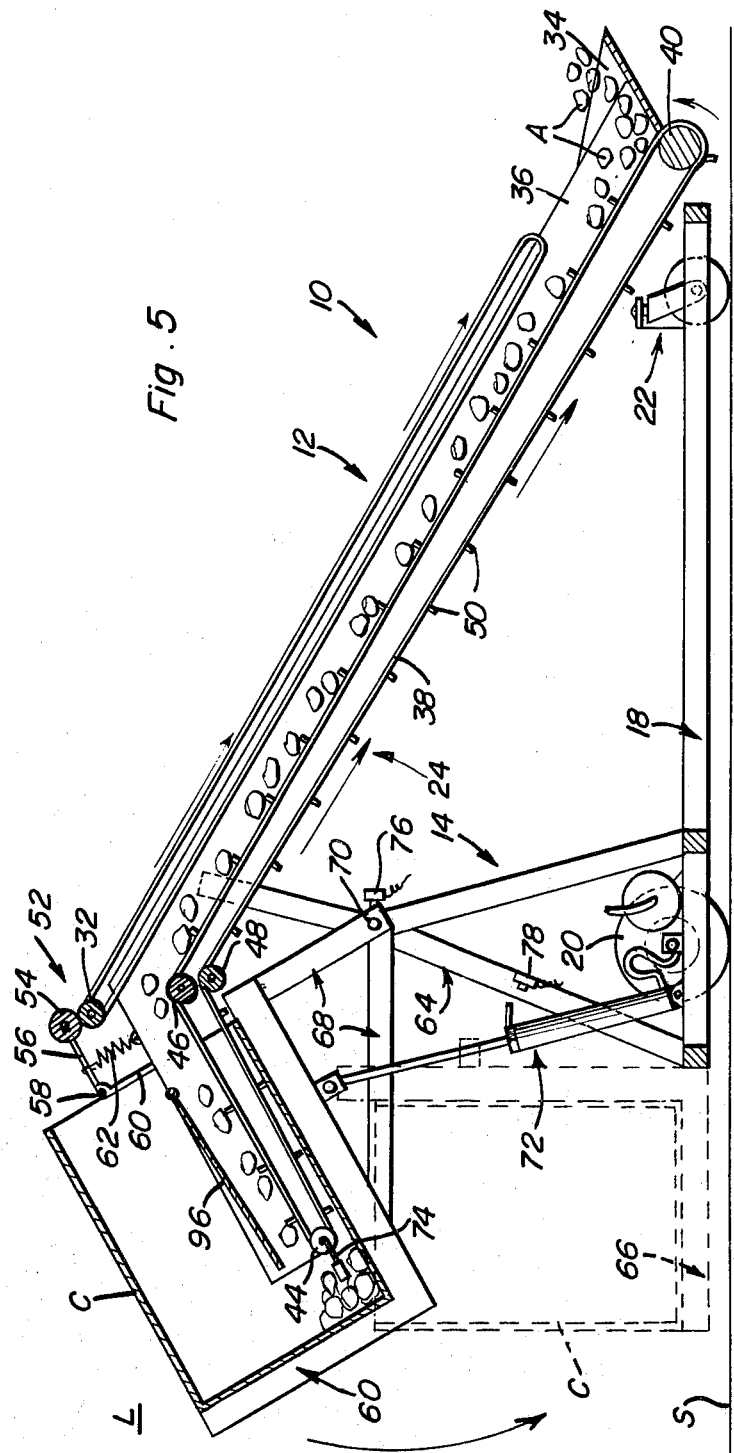
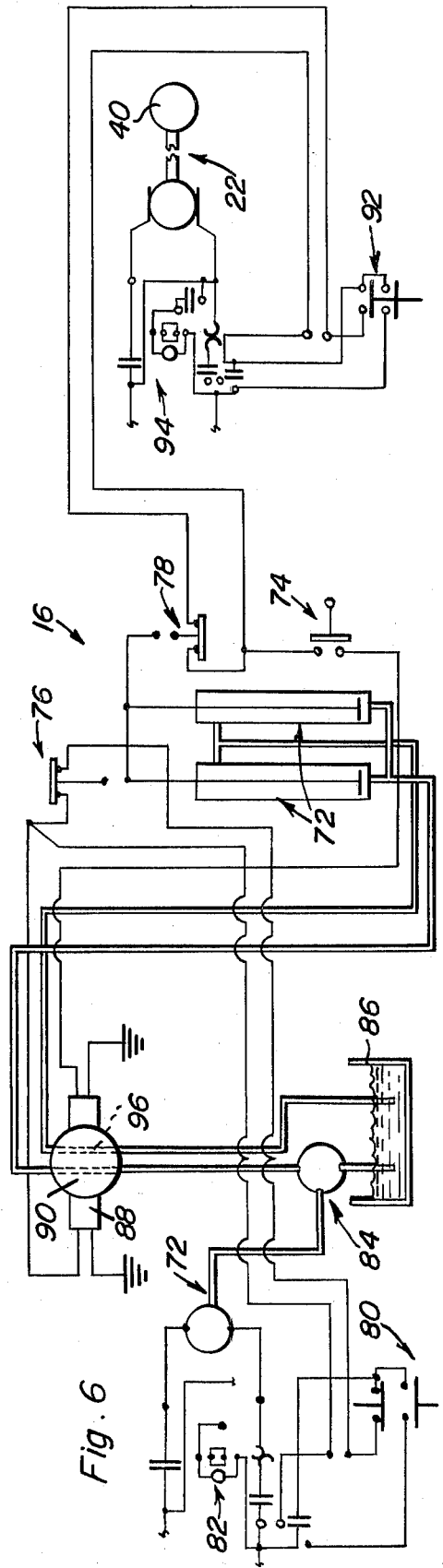
Fig. 5
Fig. 6

CONTAINER FILLING MACHINE

BACKGROUND OF THE INVENTION

1. Field of the Invention

This invention relates generally to article handling devices, and particularly to apparatus for filling a container with potatoes and similar produce without damaging the produce.

2. Description of the Prior Art

Great care must be exercised in the mechanized loading of potatoes and other like products or material into containers without bruising the product. Thus, while such mechanized loading has the great advantage of saving manual labor, difficulties have been encountered in providing economical machinery to perform the function.

U.S. Pat. Nos. 3,269,083, issued Aug. 30, 1966 to H. W. Marano, and U.S. Pat. No. 3,040,826, issued June 26, 1962 to C. E. Sheetz, disclose container filling apparatuses wherein the container moves downwardly as it is filled in order to avoid bruising of the articles being placed in the container. In particular, the loading apparatus set forth in U.S. Pat. No. 3,269,083 employs a switch actuated by a height-sensing arm in order to actuate an escapement device and lower the container. Further, U.S. Pat. Nos. 2,077,000, issued Apr. 13, 1937 to F. X. Miller, and U.S. Pat. No. 1,294,675, issued Feb. 18, 1919 to J. L. Kiner, disclose conveying elevator devices employing a pair of cooperating endless belts to facilitate the conveying of discrete articles to be placed in a container along a conveying path to an elevated loading station.

SUMMARY OF THE INVENTION

It is an object of the present invention to provide article handling equipment particularly suited for placing potatoes and other kinds of produce that are to be stored or shipped into large individual containers without damaging the product.

It is another object of the present invention to provide article handling equipment which has a steeper incline to a loader station than conventional equipment, thereby requiring less space in a shed or similar loading area.

It is yet another object of the present invention to provide handling equipment for discrete articles such as potatoes and other kinds of produce that eliminates drops by the articles of such a height that damage to the articles could occur.

These and other objects are achieved according to the present invention by providing a container filling machine having: a conveyor assembly for transporting articles to an elevated loading station; an elevator device for sequentially raising a receptacle to be filled to the elevated loading station and subsequently lowering the receptacle as same is being filled; and a control system connected to the elevator device for lowering the elevator device as a function of articles placed in the receptacle by the conveyor assembly.

The conveyor assembly includes an endless conveyor comprising a lifting portion arranged for elevating articles to the elevated loading station and a discharge portion extending into a path of travel of the elevator device for insertion into the receptacle. The control means advantageously includes a sensor mounted on the discharge portion of the conveyor assembly for detecting a level of articles in the container and lowering the elevator device as a function of the level of the articles.

The conveyor assembly also includes an endless hold-down element preferably in the form of an endless belt disposed over a single pulley disposed adjacent the loading station of the machine. The extent of the endless hold-down belt extends along the lifting portion of the conveyor assembly for holding articles on the lifting portion and enhancing the carrying capability of the conveyor assembly. By this arrangement, it is assured that the hold-down belt will not damage over-sized and bunched together articles passing upwardly along the lifting portion of the conveyor assembly.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a schematic, top plan view showing a container filling machine according to the present invention.

FIG. 2 is schematic, end elevational view looking from the left of FIG. 1.

FIG. 3 is a fragmentary, schematic, end elevational view looking from the right in FIG. 1.

FIG. 5 is a sectional view taken generally along the line 5—5 of FIG. 1.

FIG. 6 is a schematic diagram showing the electrical and fluid circuits of a control system for a container filling machine according to the present invention.

DESCRIPTION OF THE PREFERRED EMBODIMENTS

Figure 4:
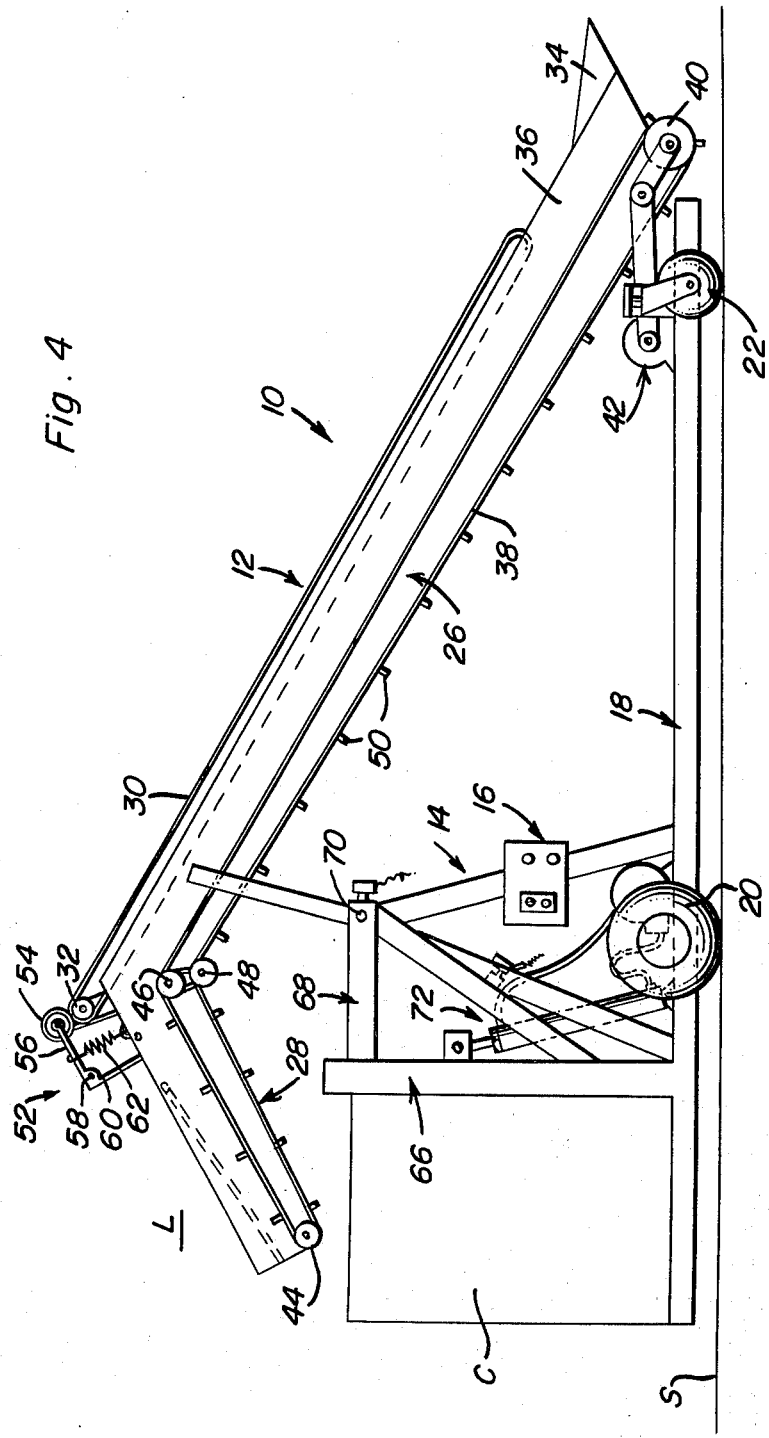
FIG. 4 is a schematic, side elevational view showing the container filling machine of FIGS. 1 through 3.

Referring now more particularly to FIGS. 1 through 4 of the drawings, a container filling machine 10 according to the present invention includes a conveyor assembly 12 for transporting articles A along an upwardly inclined path to a loading station L. An elevator device 14 is provided for sequentially raising a receptacle or container C to be filled to the loading station L and subsequently lowering the continer C as same is filled with the articles A. Connected to the elevator device 14 is a control system 16 for lowering the elevator device 14 as a function of articles A in container C.

Conveyor assembly 12, elevator device 14, and control system 16 of machine 10 are all mounted in a suitable frame 18 forming a base and provided with a pair of rotatably mounted wheels 20 and swivel casters 22 to facilitate movement of machine 10 from one position to another in a shed (not shown) and the like wherein the container filling is being performed. By this arrangement, there is provided a compact and easily movable apparatus.

The container assembly 12 includes an endless conveyor 24 comprising a lifting portion 26 arranged for lifting or elevating articles A to container C raised by the elevator device 14 to the loading station L, and a discharge portion 28 receiving articles A from the lifting portion 26 and extending into the path of travel of the elevator device for insertion into the interior of the container C in order to discharge the articles A from a point within the container C. The lifting portion 26 has associated therewith an endless hold-down 30 in the form of an endless web or other flexible element and disposed over a single pulley 32 arranged adjacent loading station L so that the hold-down 30 extends along the extent of lifting portion 26 of the conveyor 24 in order to hold articles A on the lifting portion 26 of conveyor 24. Thus, the weight of the flexible element forming the hold-down 30 will bias the articles A toward the surface of conveyor 24, but will achieve sufficient flexibility due to the lack of a pulley at the downward end of the hold-down 30 so as to prevent damage to articles A while stopping rollback of the articles A passing upwardly along the conveyor 24.

A hopper 34 is arranged at the lower end of conveyor 24 for receiving a charge of articles A to be conveyed upwardly along the extent of the conveyor 24 to the loading station L. Extending from the hopper 34 are a pair of substantially parallel, spaced walls 36 forming a frame of conveyor 24 and defining a path of movement for an endless belt 38 of conveyor 24. This belt 38 extends from a head pulley 40 disposed adjacent the hopper 34 and connected to a conventional drive 42 in a suitable manner for causing movement of the belt 38. The latter extends from the lifting portion to the discharge portion so as to have its upper and lower runs terminate in a head pulley 44 at the outermost end of the discharge portion 28. Pulleys 46 and 48 associated with the upper and lower runs, respectively, of belt 38 are disposed at the transition of the lifting portion 26 and the discharge portion 28 to permit the chain of the upper run of conveyor 24 from an upward movement to a downward movement into a container C. Longitudinally extending cleats 50 are advantageously provided on the outer surface of belt 38 for further increasing the friction of the belt 38 and increasing the carrying capacity of the endless conveyor 24.

The hold-down 30 includes a tightener assembly 52 comprising a roller 54 including a shaft permitting the roller 54 to be journaled on a pair of arms 56. The latter are pivotally mounted as by hinges 58 to rigid support 60 extending from the walls 36 of the frame of conveyor 24. The coiled tension springs 62 are connected to and arranged extending between respective arms 56 and walls 36 in order to bias roller 54, which is in contact with the flexible element forming the web of the hold-down 30 at the pulley 32, toward the pulley 32 for preventing the flexible element of hold-down 30 from slipping as pulley 32 is rotated by the movement of endless conveyor 24. More specifically, pulley 32 is connected to the pulley 46 for rotation therewith.

Elevator device 14 includes a supporting framework 64 on which is pivotally mounted an L-shaped lift 66 arranged for supportively receiving a container C. Lift 66 is pivotally mounted on framework 64 as by a truss-shaped undercarriage 68 attached to framework 64 as by pin 70. A pair of linear fluid motors 72 are pivotally mounted on frame 18 of machine 10 and pivotally attached to the lift 66 for swinging lift 66 between a lowered position as shown in FIG. 4 and a raised position adjacent the loading station L.

Referring now more particularly to FIGS. 5 and 6 of the drawings, the control system 16 includes a sensing switch 74 mounted on the pulley 44 of conveyor 24, or on other suitable structure at the outermost tip of the discharge portion 28 of conveyor 24, for detecting a level of articles A in container C and lowering the elevator device 14 as a function of the level detected.

The control system 16 also includes limit switches 76 and 78 associated with the elevator device 14 respectively for reversing movement of the elevator device 14 at the raised position, or the full line position as seen in FIG. 5, of a container C, and for stopping the elevator device 14 when a completely filled container is fully lowered and occupies the broken line position as seen in FIG. 5.

To operate the machine 10 according to the invention, a normally-open push-button start switch 80 is closed in order to energize a suitable relay 82 and energize the electric motor of a motor and pump unit 84 that drives the fluid motor 72. This unit 84 has associated therewith a tank 86 which is used as the reservoir for the working fluid employed to actuate the motor 72. Simultaneously, closing of start switch 80 also closes a circuit including the limit switch 76, which energizes an electrically controlled solenoid associated with a conventional fluid valve 88 and causes the solenoid to move to a position opening a port 90 of valve 88 and permitting the fluid to pass to the lower portions of the fluid motor 72 and cause the rams associated with the motor 72 to move upwardly and swing lift 66 to the loading station L. When elevator device 14 reaches its top position, a point on truss 68 contacts the limit switch 76, which is normally closed, and opens the switch in order to interrupt the electrical circuit including switch 76 and stop the upward swinging movement of the lift 66. At the same time, interruption of the circuit through the now open limit switch 76 will shut off the motor and pump unit 84, stopping fluid flow to the valve 88.

Once elevator device 14 is in its raised position wherein a container C is disposed at loading station L, normally-open push-button start switch 92 is closed in order to start the conveyor drive 42 and put the conveyor 24 and hold-down 30 in motion so as to convey the articles A up the lifting portion 26 and onto the discharge portion 28 of conveyor 24. A suitable relay 94 is associated with the switch 92 for the energizing of the drive 42 and actuation of an electrical circuit including the limit switch 78. As the articles A fall from the outward end of the discharge portion 28, adjacent the pulley 44, and begin to fill the container C, the level of articles in container C will build up and eventually the level of the articles in container C will become such so that articles falling into container C will come into contact with the sensing switch 74, which is normally open, so as to close a circuit including switch 74 and open the port 96 of the solenoid valve 88. The working fluid can now pass into the upper part of the cylinders of the motors 72, so that the elevator device 14 will be lowered together with the container C until such time as the sensing switch 74 comes out of contact with the articles A either already positioned in or falling into the container C, and the circuit including sensing switch 74 will be opened stopping downward movement of the elevator device 14. This action of the lowering mechanism continues until container C is filled to a desired capacity and the elevator device 14 comes to its full down position as shown in the broken lines in FIG. 5. At this full down position, a point on truss 68 will come in contact with the limit switch 78, which is a normally-closed switch, so as to open the circuit to the drive 42 and stop conveyor 24 and its associated hold-down 30. Container C is then removed and another such container C put into place on lift 66 and the above cycle repeated.

The free end of the endless belt or other web forming the hold-down 30 remains adjacent to the hopper 34 because of the weight of the material forming the web.

Also, greater speed of hold-down 30 will create inertia that causes the web to climb down toward hopper 34 over the conveyor 24 and the product being conveyed upwardly.

It should be noted that a flap 96 can be pivotally mounted between the walls 36 of the frame of conveyor 24 at discharge portion 28 in order to maintain the articles A adjacent the upper run of the belt 38 of conveyor 24 as they approach the discharge end of the conveyor assembly 12.

As can be seen from the above description and from the drawings, a container filling machine according to the invention provides a simple and compact, yet rugged and reliable, device for automatically filling containers with potatoes and like produce. The only manual manipulations needed to be performed are placement of containers on and removal from the elevator device, and the discharge of the articles into hopper 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A container filling machine, comprising, in combination:
   a. conveyor means for transporting articles to an elevated loading station;
   b. elevator means for sequentially raising a container to be filled to the loading station and subsequently lowering the container as same is filled; and
   c. control means connected to the elevator means for lowering the elevator means as a function of articles in the container, the conveyor means including a discharge portion extending into a path of travel of the elevator means for insertion into the container, and the control means including sensing means are mounted on the discharge portion of the conveyor means for detecting a level of articles in the container and lowering the elevator means as a function of the level detected, and the conveyor means further including an endless conveyor comprising a lifting portion arranged for lifting articles to the loading station, and also including the discharge portion, with the latter arranged for receiving articles from the lifting portion, a pulley arranged over the endless conveyor at the transition thereof between the lifting portion and the discharge portion, with an endless hold-down including a web being disposed over only the pulley and extending along the lifting portion of the endless conveyor for holding articles on the lifting portion as the articles are conveyed to the discharge portion.

2. A structure as defined in claim 1, wherein the conveyor means further includes an endless flexible member provided with a plurality of longitudinally extending cleats arranged extending transversely of the directions of movement of the flexible member for increasing friction of the flexible member, and a drive connected to the endless conveyor for moving the flexible member along a conveying path defined by the lifting portion and the discharge portion, the pulley of the endless hold-down being connected to the endless conveyor for rotation thereby, and the endless hold-down comprising a tightener assembly including a roller disposed contacting the web of the hold-down at the pulley thereof, and a spring mounted on the conveyor means and arranged biasing the roller against the web and the pulley for preventing the web from slipping as the pulley is rotated by the endless conveyor.

3. A structure as defined in claim 1, wherein the control means further includes switches associated with the elevator means and respectively arranged for reversing movement of the elevator means at the raised position of the container and for stopping the elevator means when a filled container is swung downwardly to a lowered position of the elevator means.

4. A structure as defined in claim 1, wherein the elevator means includes, in combination:
   1. a supporting framework;
   2. a lift for supportively receiving a container and pivotally mounted on the framework for swinging movement relative thereto; and
   3. a motor mounted on the framework and connected to the lift for swinging the lift between a lowered position and a raised position of the elevator means.

5. A structure as defined in claim 4, wherein the control means further includes switches associated with the elevator means and arranged respectively for reversing movement of the elevator means at the raised position thereof and for stopping the elevator means at the lowered position thereof.

6. A structure as defined in claim 2, wherein the control means further includes switches associated with the elevator means and respectively arranged for reversing movement of the elevator means at the raised position of the container and for stopping the elevator means when a filled container is swung downwardly to a lowered position of the elevator means.

7. A structure as defined in claim 5, wherein the conveyor means further includes an endless flexible member provided with a plurality of lonhgitudinally extending cleats arranged extending transversely of the direction of movement of the flexible member for increasing friction of the flexible member, and a drive connected to the endless conveyor for moving the flexible member along a conveying path defined by the lifting portion and the discharge portion, the pulley of the endless hold-down being connected to the endless conveyor for rotation thereby, and the endless hold-down comprising a tightener assembly including a roller disposed contacting the web of the hold-down at the pulley thereof, and a spring mounted on the conveyor means and arranged biasing the roller against the web and the pulley for preventing the web from slipping as the pulley is rotated by the endless conveyor.

8. A container filling machine, comprising, in combination:
   a. conveyor means for transporting articles to an elevated loading station;
   b. elevator means for sequentially raising a container to be filled to the loading station and subsequently lowering the container as same is filled ; and
   c. control means connected to the elevator means for lowering the elevator means as a function of articles in the container, the conveyor means including an endless conveyor comprising a lifting portion arranged for elevating articles to a container raised by the elevator means and a discharge portion arranged for receiving articles from the lifting portion, and an endless hold-down including a web and a single pulley, with the web disposed over only the pulley and arranged extending along the lifting portion of the conveyor for holding articles on the lifting portion.

9. A conveyor system for lifting articles, comprising, in combination:
   a. a supporting frame;
   b. an endless conveyor mounted on the supporting frame and arranged for transporting articles along a conveying path, the endless conveyor comprising a lifting portion arranged for elevating articles;
   c. a pulley mounted on the supporting frame above the conveying path of the endless conveyor; and
   d. an endless hold-down including a web and a single pulley, with the web disposed over only the pulley and arranged extending along the lifting portion of the conveyor for holding articles on the lifting portion of the endless conveyor during transportation of the articles.

* * * * *